United States Patent
Reichel et al.

(10) Patent No.: US 7,350,092 B2
(45) Date of Patent: *Mar. 25, 2008

(54) DATA SYNCHRONIZATION ARRANGEMENT

(75) Inventors: Norbert Reichel, Wartenberg (DE); Joerg Goller, Zweikirchen (DE)

(73) Assignee: Texas Instruments Deutschland GmbH, Dallas, TX (US)

( * ) Notice: Subject to any disclaimer, the term of this patent is extended or adjusted under 35 U.S.C. 154(b) by 289 days.

This patent is subject to a terminal disclaimer.

(21) Appl. No.: 11/074,443

(22) Filed: Mar. 8, 2005

(65) Prior Publication Data

US 2005/0201163 A1    Sep. 15, 2005

(30) Foreign Application Priority Data

Mar. 10, 2004    (DE)    ............... 10 2004 011 673

(51) Int. Cl.
    *G06F 1/12*    (2006.01)
    *G11C 8/00*    (2006.01)
    *H04L 7/00*    (2006.01)
(52) U.S. Cl. .............. 713/400; 365/233; 375/354
(58) Field of Classification Search ........ 713/400, 713/500, 600; 365/233; 375/354; 710/58
    See application file for complete search history.

(56) References Cited

U.S. PATENT DOCUMENTS

| | | | | |
|---|---|---|---|---|
| 5,602,878 A | * | 2/1997 | Cross | ........... 375/354 |
| 6,396,887 B1 | * | 5/2002 | Ware et al. | ......... 375/354 |
| 6,724,683 B2 | * | 4/2004 | Liao | ............ 365/233 |
| 6,920,578 B1 | * | 7/2005 | Thompson et al. | ....... 713/600 |
| 7,134,035 B2 | * | 11/2006 | Sharma et al. | ........... 713/500 |
| 7,145,831 B2 | * | 12/2006 | Goller et al. | .......... 365/233 |
| 2006/0212618 A1 | * | 9/2006 | De Groot et al. | ......... 710/58 |

FOREIGN PATENT DOCUMENTS

EP    1 150 450 A2    10/2001

* cited by examiner

*Primary Examiner*—Suresh K Suryawanshi
(74) *Attorney, Agent, or Firm*—Wade J. Brady, III; Frederick J. Telecky, Jr.

(57) ABSTRACT

A data synchronization arrangement is provided for exchanging clocked data between different clock domains running at the same clock frequency but at an arbitrary relative phase shift. An input data stream synchronized in the first clock domain is written into respective locations of a buffer memory through a write select multiplexer under control of a write select shift register clocked by the first domain clock. An output data stream synchronized in the second clock domain is read from the respective locations of the buffer memory through a real select multiplexer under control of a read select shift register clocked by the second domain clock. A bit synchronization circuit is provided for loading the read select shift register with a bit pattern that has a relative offset relative to the bit pattern of the write select shift register, to correlate for the difference in clock phases.

11 Claims, 3 Drawing Sheets

DATA SYNCHRONIZATION ARRANGEMENT

CROSS REFERENCE TO RELATED APPLICATIONS

This application claims priority under 35 USC § 119 of German Application Serial No. 102004011673.3, filed Mar. 10, 2004.

FIELD OF THE INVENTION

The present invention relates to a data synchronization arrangement for exchanging clocked data between different clock domains running in a digital processing equipment at substantially the same clock frequency but at an arbitrary relative phase shift.

BACKGROUND OF THE INVENTION

A problem of metastability exists in a system where synchronous signals are exchanged between different clock domains of the same clock frequency but an arbitrary phase relation between the clock signals. Data signals that may change their logical state every clock period need some temporary storage to ensure a stable state when they are latched. In addition, the time a bit resides in a memory may be critical in some systems. So, another problem is the latency introduced in the data path when data are exchanged between different clock domains.

A conventional solution to these problems is to use a FIFO memory as a temporary storage. For write and read operations, incremented/decremented pointers are used that are synchronized to only one of the clock signals. This is not a fail-safe solution. The mean time between failures (MTBF) is a figure that depends on the phase relation between the clock signals and the frequency at which the FIFO memory is operated.

SUMMARY OF THE INVENTION

The present invention provides a data synchronization arrangement that is fail-safe at high speed. Specifically, the invention provides a data synchronization arrangement for exchanging clocked data between different clock domains running in a digital processing equipment at the same clock frequency but at an arbitrary relative phase shift. The data synchronization arrangement comprises a buffer memory with a predetermined limited number of memory locations each of which has a data write port and a data read port. A write select multiplexer has a data input receiving an input data stream synchronized with the clock from a first clock domain, one data output for each of said memory locations and connected to a respective data write port, and one write select input for each data output. A read select multiplexer has one data input for each of the memory locations and connected to a respective data read port, one read select input for each data input, and a data output supplying an output data stream synchronized with the clock from a second clock domain. A write select shift register has a number of stages corresponding to the predetermined number of memory locations and an output stage looped back to an input stage, each stage having an output connected to a respective one of the write select inputs of the write select multiplexer. The write select shift register is clocked with the clock from the first clock domain. A read select shift register has a number of stages corresponding to the predetermined number of memory locations, each stage having an output connected to a respective one of the read select inputs of the read select multiplexer. The read select shift register is clocked with the clock from the second clock domain. A bit synchronization circuit is provided for loading each shift register with a bit pattern that contains only one high logic value, the bit patterns in the shift registers having a relative offset. In operation, a data input stream synchronized with the clock of the first clock domain is applied to the data input of the write select multiplexer and a data output stream synchronized with the clock of the second clock domain is taken from the data output of the read select multiplexer.

By introducing an appropriate fixed offset between the bit patterns in the two shift registers, data are never read while they are being written. The offset between the bit patterns of the shift registers can be set by the designer such that no violation of timing requirements for the hardware will occur. The risk to lose a bit of information is exactly zero, and the MTBF is infinite.

In a preferred embodiment, the bit synchronization circuit, on each power-on of the arrangement, loads a bit pattern with only one high logic value into the write shift register, the read shift register initially containing only low logic values. A high logic value appearing in the most significant bit stage of the write shift register is then synchronized with the read clock and loaded into the least significant bit stage of the read shift register. In this way, a maximum offset between write and read operations is ensured for a given depth of the shift registers.

In an advantageous embodiment of the invention, the buffer memory has four memory locations, and the shift registers have four stages. With such a configuration, a delay of two or three, but at least two, read clock cycles is introduced between a write operation and a read operation for the same datum.

DETAILED DESCRIPTION OF THE DRAWINGS

Figure 1:
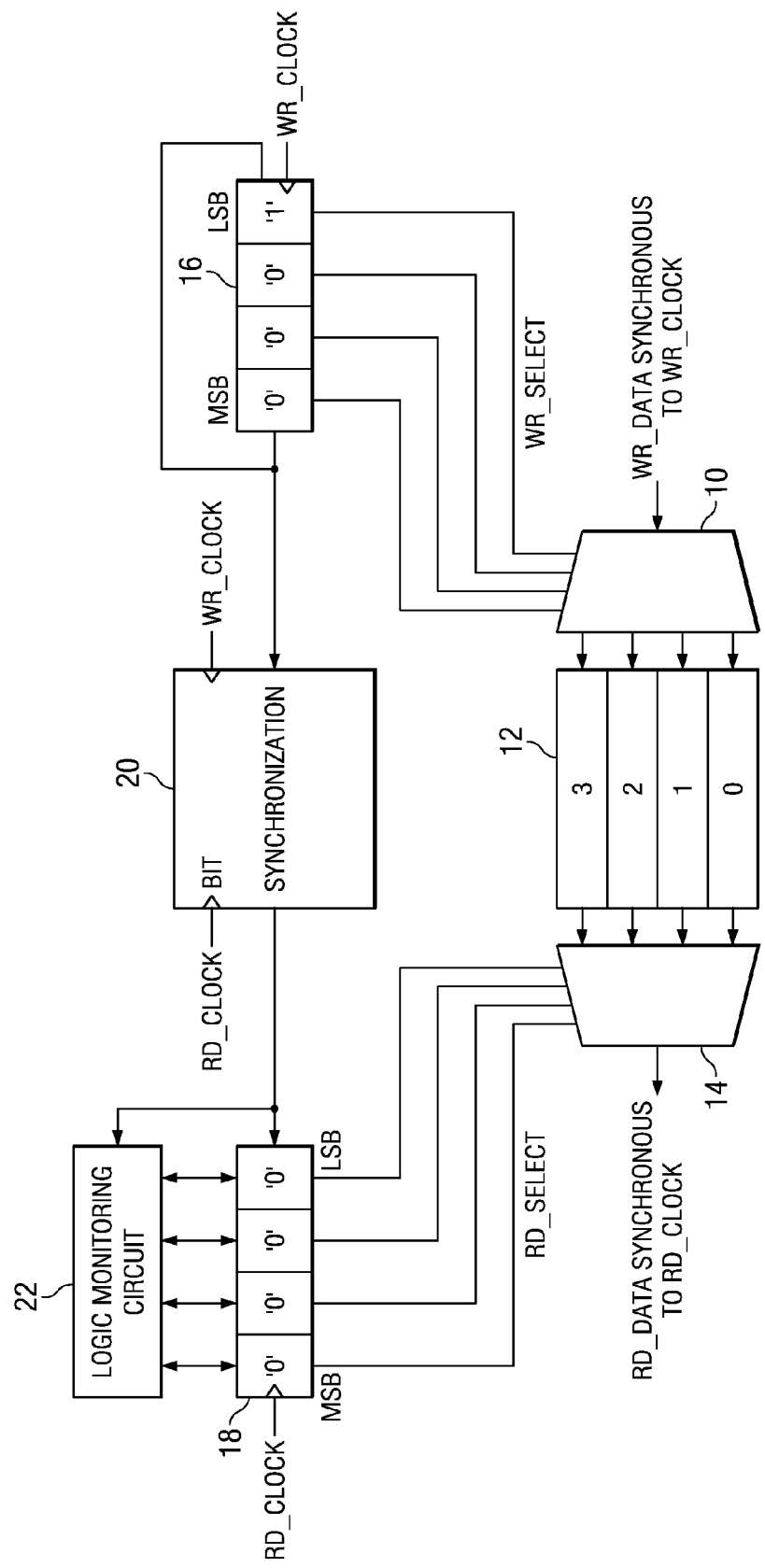
FIG. 1 is a block diagram of the data synchronization arrangement.

With reference to FIG. 1, a data synchronization arrangement is shown intended to be used for exchanging data between different clock domains running in a digital processing equipment at the same clock frequency but at an arbitrary relative phase shift between the clock signals. While the invention will be disclosed with reference to bits of data that are exchanged sequentially between single data lines, it should be understood that the same concepts are applicable to busses with parallel data lines.

In FIG. 1, reference numeral 10 designates a 1-to-4 multiplexer referred to as a write select multiplexer. Write select multiplexer 10 has a serial data input WR_DATA and four data outputs. Data input WR_DATA receives a serial data input synchronized with a clock signal from a first clock domain. A buffer memory 12 has four memory locations, each memory location having a data write port and a data read port. Each data output of the write select multiplexer 10 is connected to one data write port of a buffer memory 12. Each data read port of buffer memory 10 is connected to one out of four data inputs of a 4-to-1 multiplexer 14, referred to as a read select multiplexer. Read select multiplexer 14 has a serial data output that provides an output data stream RD_DATA that is synchronized with a clock signal from a second clock domain, as will be explained further.

Write select multiplexer 10 has four write select inputs each of which is connected to an output of one out of four stages of a write select shift register 16. The output of the MSB (most significant bit) stage of shift register 16 is looped back to the input of the LSB (least significant bit) stage. Write select shift register 16 is clocked by the clock signal from the first clock domain, referred to as write clock WR_CLK.

Read select multiplexer 14 has four read select inputs each of which is connected to an output of one out of four stages of a read select shift register 18. Read select shift register 18 is clocked by the clock signal from the second clock domain, referred to as read clock RD_CLK.

A bit synchronization circuit 20 is inserted between the output of the MSB (most significant bit) stage of write select shift register 10 and the input of the LSB (least significant bit) stage of read select shift register. The bit synchronization circuit 20 is effective to introduce a fixed offset between bit patterns loaded into shift registers 16 and 18 and to keep the offset constant throughout operation of the arrangement. At any time, the bit pattern in write select shift register 16 has only one high value. On power-on of the arrangement, a high logic value is loaded into the least significant bit stage and low logic values are loaded in the three remaining stages of write select shift register 16, and low logic values are loaded into all the stages of the read select shift register 18. This reset condition is illustrated in FIG. 1. When a high logic value appears at the most significant bit output of write select shift register 16 after three initial write clock cycles, the next clock pulse shifts a logic high value into the bit synchronization circuit 20, which shifts a logic high value into the least significant bit stage of read select shift register 18 after synchronization with read clock RD_CLK. Thus, the bit synchronization circuit 20 introduces a delay of two or three, but at least two, read clock cycles before the synchronized bit enters the read select shift register 18. The constant offset between the bit patterns in both shift registers introduces a corresponding delay between a write and a read operation for the same data in buffer memory 12. In other words, memory locations that are addressed for reading have been written to at least two read clock cycles before, and never can a memory location be read from while data are written to it.

As disclosed so far, identical frequencies are assumed for both of the read and write clock signals. In the preferred embodiment, the clock frequencies are allowed to differ slightly, although generally not more than about one percent. In this case, and in the assumption that the write clock WR_CLK has a higher frequency, more than only one logic high value may momentarily happen to occur in the four stages of read select shift register 18. The logic states of all stages in read select shift register 18 are monitored by an associated logic monitoring circuit 22. When the read select shift register 18 is about to shift in a new high logic value into the LSB stage and another stage, except the MSB stage, still has a high value loaded, the logic monitoring circuit 22 discards one of them, preferably the one in a more significant stage, so that only one high value will remain in the shift register after the next shift procedure. This avoids data to be read from different stages of buffer memory 12 at the same time, although one datum from the input data stream will be lost. In the assumption that the write clock WR_CLK has a lower frequency, a situation may momentarily occur where all four stages of read select shift register 8 have a logic low value. In that case, a datum is inserted in the output data stream.

In any case, once the write and read select shift registers 16, 18 have been initialized as disclosed, failsafe operation of the arrangement is ensured at any time in that data can never be read while the same data are being written.

Figure 2A:
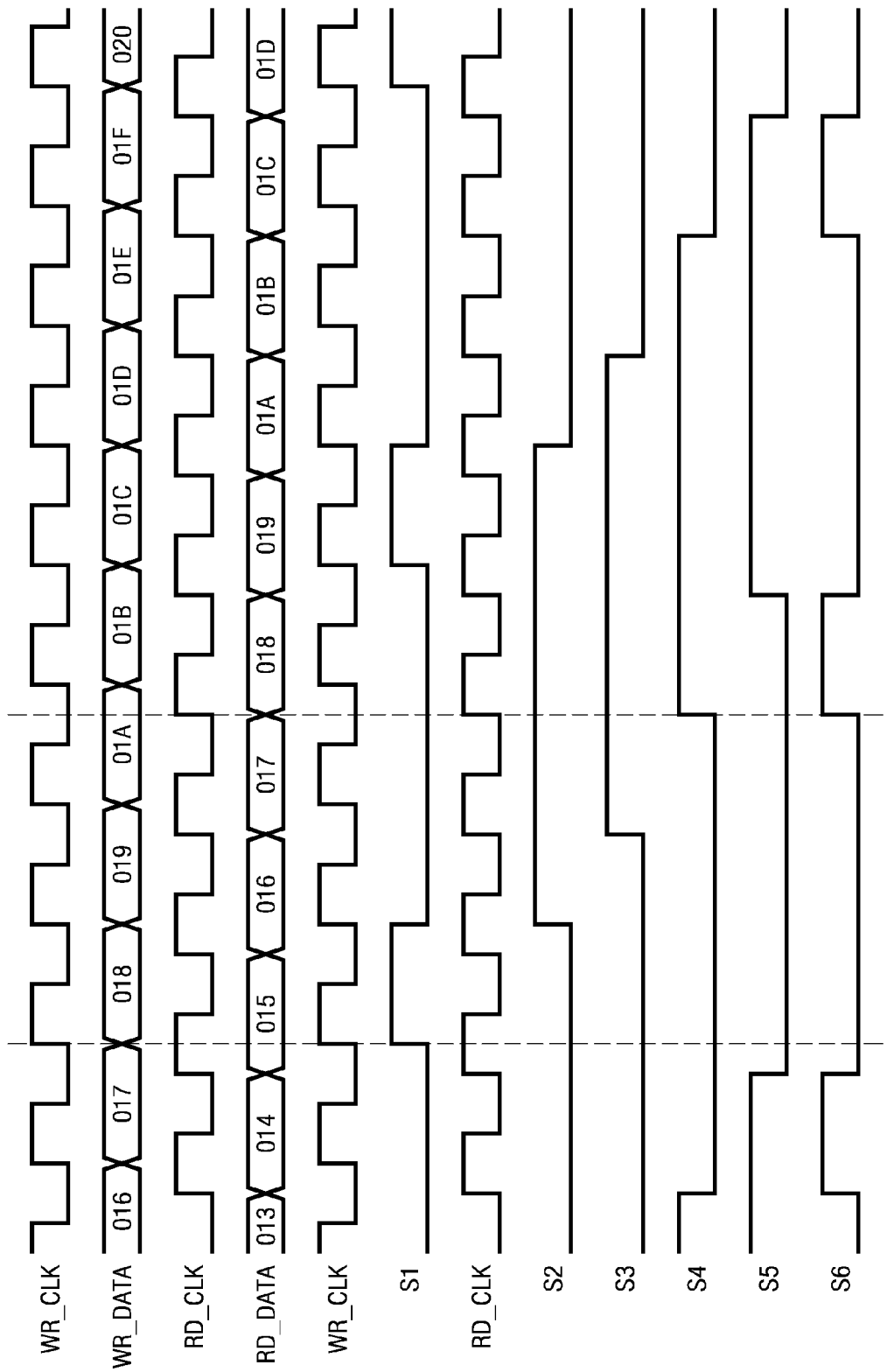
FIGS. 2a to 2c are a signal diagrams illustrating a synchronization process.

With reference to FIG. 2a, clock signals WR_CLK and RD_CLK are seen to have the same frequency and a relative phase shift of $\pi/2$. Signal S1 in FIG. 2 represents a pulse sequence that appears at the MSB output of write select shift register 16. It has a frequency of the clock frequency divided by four, and a duty cycle of 1:4. This signal S1 is converted by the bit synchronization circuit 20 into a signal S2 that toggles with each high pulse of signal S1 in synchronism with the write clock WR_CLK. Signal S2 has only half the frequency of signal S1. Signal S2 is then synchronized with the read clock RD_CLK by a two-stages synchronizer within circuit 20, as illustrated by signals S3 and S4 in FIG. 2a. A suitable synchronizer may be built with two flip-flops clocked with the read clock RD_CLK. Signal S5 is signal S4 shifted by one clock cycle, and signal S6 is a pulse signal generated from signal S5 to be analogous with signal S1. The pulse sequence represented by signal S6 is shifted into the read shift register.

With this synchronization method, since the signals used have a much lower frequency than the clock frequency, a synchronization boundary is achieved that is suitable for high-speed operation. The latency of the synchronization boundary is only determined by the latency of the bit synchronizing circuit, which is the minimum possible.

Figure 2B:
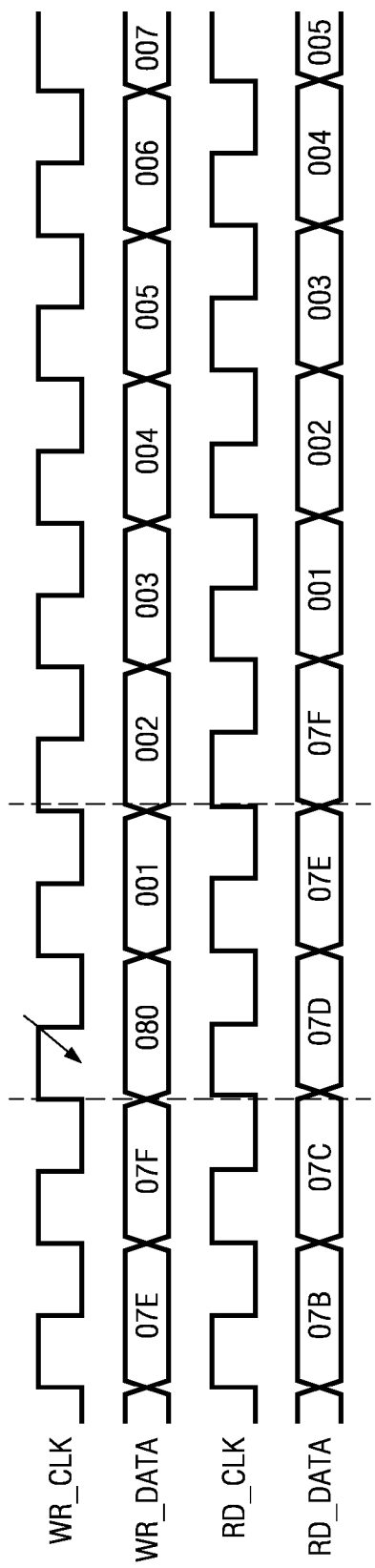

FIG. 2b illustrates a situation where the write clock WR_CLK has a slightly higher frequency than the read clock RD_CLK. As is seen, one datum may be dropped occasionally, due to the necessity of discarding one out of two logic high values appearing simultaneously at read select shift register 18. In FIG. 2b, datum "080" is lost from the input data stream WR_DATA.

Figure 2C:
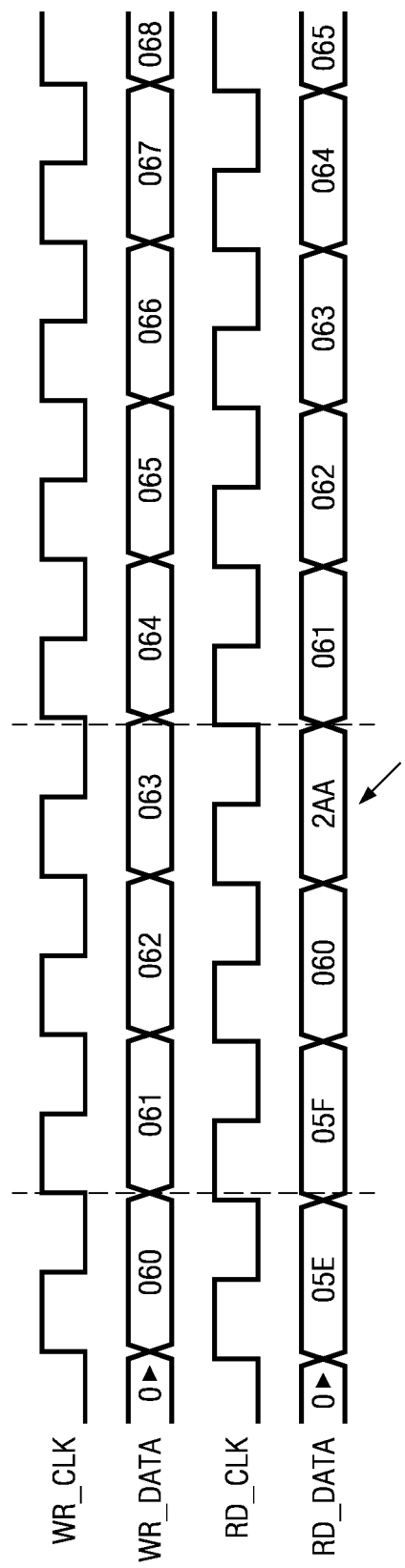

FIG. 2c illustrates a situation where the write clock WR_CLK has a slightly lower frequency than the read clock RD_CLK. As is seen, one datum "2AA" is inserted into the input data stream WR_DATA.

In a practical embodiment, the buffer memory 12 is formed by a set of single registers or by a bank of registers; each register may be formed by a D-Flip-Flop.

The arrangement disclosed may be considered as a serial interface with input WR_DATA and output RD_DATA in case serial data are exchanged.

In case data are exchanged between data busses, each bus line needs a buffer memory and a multiplexer as disclosed, but only one select mechanism with a write select shift register and a read select shift register is required for all bus lines.

The invention claimed is:
1. A data synchronization arrangement for exchanging clocked data between different clock domains running in a digital processing equipment at substantially the same clock frequency but at an arbitrary relative phase shift, comprising:
 a buffer memory with a predetermined number of memory locations each of which has a data write port and a data read port,
 a write select multiplexer having a data input for receiving an input data stream synchronized with the clock from a first clock domain, one data output for each of said memory locations and connected to a respective data write port, and one write select input for each data output;

a read select multiplexer having one data input for each of said memory locations and connected to a respective data read port, one read select input for each data input, and a data output supplying an output data stream synchronized with the clock from a second clock domain;

a write select shift register with a number of stages corresponding to the predetermined number of memory locations and an output stage looped back to an input stage, each stage having an output connected to a respective one of the write select inputs of the write select multiplexer, the write select shift register being clocked with the clock from the first clock domain;

a read select shift register with a number of stages corresponding to the predetermined number of memory locations, each stage having an output connected to a respective one of the read select inputs of the read select multiplexer, the read select shift register being clocked with the clock from the second clock domain; and a bit synchronization circuit for shifting bits from the write select shift register to the read select shift register to provide a relative offset between the bit patterns in the respective shift registers in response to clocking with the clocks in the first and second clock domains.

2. The data synchronization arrangement of claim 1, wherein the bit synchronization circuit, on each power-on of the arrangement, loads a bit pattern with only one high logic value into the write select shift register and loads only logic low values into the read select shift register, and loads a high logic value appearing in the most significant bit stage of the write select shift register, into the least significant bit stage of the read shift register after synchronization with the clock signal from the second clock domain.

3. The data synchronization arrangement of claim 2, wherein the high logic value is initially loaded into the least significant bit stage of the write select shift register.

4. The data synchronization arrangement of claim 2, wherein the bit synchronization circuit:

derives a pulse sequence from the output of the write select shift register, converts the pulse sequence into an intermediate signal that toggles with each high state of the pulse sequence in synchronism with the clock from the first clock domain, synchronizes said intermediate signal to the clock of the second clock domain, converts the intermediate signal synchronized with the clock of the second clock domain into a pulse sequence likewise synchronized with the clock of the second clock domain, and shifts said pulse sequence synchronized with the clock of the second clock domain, into the read select shift register.

5. The data synchronization arrangement according to claim 1, wherein the buffer memory has four memory locations and the write and read select shift registers have a depth of four bits.

6. The data synchronization arrangement according to claim 1, wherein the frequencies of the clocks from the first and from the second clock domains are permitted to differ by a maximum of about one percent.

7. The data synchronization arrangement according to claim 6, further comprising logic circuitry monitoring the contents of the stages in the read select shift register and allowing not more than one logic high value to be present in all stages at any time.

8. The data synchronization arrangement according to claim 7 wherein, when the logic circuitry detects whether more than one logic high value will be loaded in the stages of the read select shift register with the next clock cycle, it discards the high logic value that is loaded in the more significant stage.

9. The data synchronization arrangement according to claim 1, wherein the data are serial data.

10. The data synchronization arrangement according to claim 1, wherein the data are exchanged on parallel bus lines, each bus line having an associated buffer memory and associated write and read select multiplexers, the parallel bus lines having a common select mechanism for the write and read select multiplexers.

11. The data synchronization arrangement of claim 1, wherein the bit synchronization circuit is connected for shifting a most significant bit of the write select shift register to a least significant bit of the read select shift register.

* * * * *